(12) United States Patent
Martínez (10) Patent No.: US 8,205,419 B2
(45) Date of Patent: Jun. 26, 2012

(54) SELF-PROPELLED BAGGING MACHINE FOR STORING GRAIN IN A SLEEVE

(75) Inventor: Carlos Alberto Martínez, Buenos Aires (AR)

(73) Assignee: Carlos Alberto Martinez (AR)

( * ) Notice: Subject to any disclaimer, the term of this patent is extended or adjusted under 35 U.S.C. 154(b) by 322 days.

(21) Appl. No.: 12/533,248

(22) Filed: Jul. 31, 2009

(65) Prior Publication Data
US 2010/0037569 A1 Feb. 18, 2010

(30) Foreign Application Priority Data
Aug. 12, 2008 (AR) .............................. P20080103508

(51) Int. Cl.
*B65B 9/10* (2006.01)
(52) U.S. Cl. .......................................... 53/567; 53/457
(58) Field of Classification Search .................... 53/441, 53/457, 459, 567, 564
See application file for complete search history.

(56) References Cited

U.S. PATENT DOCUMENTS

| | | | | |
|---|---|---|---|---|
| 3,030,875 A | * | 4/1962 | Vutz et al. | 100/19 A |
| 3,420,390 A | * | 1/1969 | Taggart | 414/339 |
| 3,912,057 A | * | 10/1975 | Krouse et al. | 192/219 |
| 3,941,266 A | * | 3/1976 | Havens | 414/334 |
| 5,003,754 A | * | 4/1991 | Stirling | 53/459 |

* cited by examiner

*Primary Examiner* — Paul R Durand
(74) *Attorney, Agent, or Firm* — Thomas W. Toplin; Tolpin & Partners, PC (57) ABSTRACT

A self-propelled bagging machine for storing grain in a sleeve (unfolding plastic film pipe or silo bag) made up of an upper receiving hopper which outlet leads to a grain discharge tunnel over which such folded sleeve fits, all of this mounted on a chassis equipped with running gear and dragging pole, where such hopper outlet comprises a wall that is transversally connected to the hopper according to a downward slant plane leading to the discharge tunnel arranged under the vertical projection of the mouth of said hopper, and where such running gear comprises a back single-shaft running gear that is connected to the wheels, and a smaller front steering running gear; such grain bagging machine further includes: a dual compensated braking device made up of an adjustable primary hydraulic braking mechanism and an adjustable secondary hydraulic braking mechanism which act simultaneously on the back shaft of the bagging machine, and where a mechanic articulation mounted on the chassis in such a way that it is sensitive to pulling variations during the machine operation activates an inverted operation hydraulic pump for reception/release of braking fluid from/to the secondary braking mechanism circuit for braking compensation. Dual compensated braking device to be applied to the self-propelled grain bagging machine described above.

12 Claims, 13 Drawing Sheets

SELF-PROPELLED BAGGING MACHINE FOR STORING GRAIN IN A SLEEVE

CROSS REFERENCES TO RELATED APPLICATIONS

This application is a based upon priority Argentina Patent Application No. P 2008 0103508 filed Aug. 12, 2008.

BACKGROUND OF THE INVENTION

The present invention is related to the field of agricultural tools and appliances, particularly related to the field of agricultural machinery, mainly that known as hauling machinery, which, at the same time, is self-propelling while being used.

There are many grain bagging machines known to be used to form silos inside very long bags made up of plastic endless sleeves, such bagging machines consisting of structures that can be attached to traction vehicles, having a receiving hopper to collect the grain from the harvester, the hopper being connected to a tunnel leading to an outlet which mouth has been previously fitted into the above-mentioned sleeve, which is conveniently folded to spread out as the silo is filled, such sleeve having an initial knot that determines its bottom, and being cut and knotted at the opposite end once the silo is full.

Such bagging machines are fitted with running gear and are pulled forward by a tractor, leaving behind the silo deposited on the ground.

The problem with all of them is that it is difficult to graduate their pace, which may result in an inadequate grain compacting due to a fast forward movement of the machine, or in the full sleeve not receiving the amount of grain dropping in through the hopper, thus causing the bagging machine to get saturated due to its slow forward movement.

It can then be inferred that it is desirable to have a bagging machine that moves forward at a speed determined by the amount of load received, i.e., a speed that allows it to synchronize its forward movement according to the amount of material that is fed into the machine, thus producing a homogenous compacted silage volume.

Patent AR 010974 B1, which is herein fully incorporated by way of reference, refers to a self-propelled bagging machine (1) for storing grain in a sleeve (M). The bagging machine (1) receives the grain load through an upper hopper (5), breaking down its drop force by means of an inside slant partition wall (6) so that a component of such force is capable of compacting the grain inside the silo (S) while the other component is capable of driving the machine (1) into a gradual forward movement. The bagging machine (1) is mounted onto a chassis (2) with running gear (10) fitted with a dragging pole to allow towing when not in operation, and has a width reduction device (3) for easy transportation.

The possibility to reduce the width of the machine for easy transportation involves a pivot system (3) with a central vertical shaft that links the chassis structure (2) with the actuator assembly (4) of the bagging machine (1) in such a way that, being the useful width of the actuator assembly (4) considerably larger than the running gear gage (10) and its length shorter, when hooked to the traction vehicle that will tow it to another workplace or the parking place, a 90° turn occurs, leaving such actuator assembly (4) with its shorter size crosswise, without exceeding the allowed gage width and ensuring a road traffic risk-free circulation. See FIGS. 1 and 2.

The bagging machine (1) described in said patent AR 010974 B1 optimizes the grain bagging operation, with the additional advantage of requiring a single traction vehicle for transportation while in inactive mode, thanks to its autonomous operation.

However, the grain bagging machine described in said patent has a few drawbacks, namely:
when used to feed grain into a silo, it moves forward too fast; this movement must be invariably graduated by braking so that bagging complies with the minimum effective storage requirements; and
attaching the bag to the support demands more than one worker, considering that the plastic bag weighs about 110 to 130 kg, which makes it impossible for a single man to place it in its working position.

It should particularly be noted that the braking device (14) used by the grain bagging machine (1) described in patent AR 010974 B1 mentioned above is dual, meaning that each running gear wheel (10) in the machine (1) has an independent brake adjustment mechanism, which usually causes the machine (1) to go off the expected track if calibration is inadequate or asymmetrical. Likewise, calibrating two independent brakes (14) so that they may allow for a smooth forward movement is neither an easy nor a quick task.

On the other hand, the ground on which the machine runs is usually uneven, and such unevenness may alter the force breakdown generated during the grain drop, which, in addition to a different breakdown of the force of gravity acting on the machine's center of gravity, worsen the problems derived from an inadequate calibration of the braking device.

Therefore, in order to avoid the above-mentioned inconveniences during grain bagging, it is advisable to have a self-propelled bagging machine for storing grain in a sleeve that combines all of the following features: the ability to move forward in a controlled and effective way during grain bagging on any terrain, avoiding side slides off the track previously set by the operator, and allowing a single worker to attach the silo bag in the right position to be filled.

BRIEF SUMMARY OF THE INVENTION

The object of this invention is a self-propelled bagging machine for storing grain in a sleeve comprising a tilting chassis on a single-shaft running gear permanently associated with the wheels, to be towed to its workplace by means of a dragging pole, and fitted with a smaller running gear that only rests on the ground during grain bagging, acting like a steering stabilizer and corrector. An upper bulk grain receiving hopper is mounted on it, which back outlet leads to a grain discharge tunnel and which vertical projection makes it possible for the incoming grain flow to reach an inner slant partition wall arranged downwards to the bottom leading to a tunnel with a back opening connected to the mouth of a foldable sleeve or bag intended to contain the stored grain.

It is precisely this slant plane connected to the bagging machine that makes it possible for the grain flow falling vertically on it to generate such a force that it is broken down in two directions, driving the grain bagging machine forward—having been checked in practice that this driving force itself activates the forward movement of the machine. Likewise, the slope generated in the bag pushes the bagging machine forward.

On the other hand, the right working position—as far as the bagging machine leveling is concerned—is given by a front stabilizing running gear height adjustment mechanism. Likewise, once hooked for transportation, the stabilizing gear will be lifted from the ground, and the single shaft on which the equipment will run, released from its attachment to the wheels, will make handling easier.

The grain discharge hopper is collapsible, which allows safe transportation of the bagging machine from one workplace to another. The hopper is folded and unfolded by means of an engine-driven articulated arm, such as a hydraulic mechanism.

In order to efficiently check the running speed of the bagging machine subject matter of this invention, a dual compensated braking device is included, comprising: an adjustable primary hydraulic braking mechanism and an adjustable secondary hydraulic braking mechanism which act simultaneously on the back shaft of the bagging machine, and where a mechanic articulation mounted on the chassis sensitive to pulling variations during machine operation acts on an inverted operation hydraulic pump for reception/release of braking fluid from/to the secondary braking mechanism circuit for braking compensation.

Preferably, the self-propelled grain bagging machine features a dual compensated braking device comprising:

a primary braking mechanism made up of a primary circuit with braking fluid for transmitting working pressure on a primary caliper, such pressure being generated by means of a first hydraulic pump; and a secondary braking mechanism made up of a secondary circuit with braking fluid for transmitting working pressure on a secondary caliper, such pressure being generated by means of a second hydraulic pump;

where both the primary and secondary calipers act on opposite sides of a disk brake attached to an effector shaft that comprises a first sprocket connected by means of a drive chain to a second sprocket mounted on the shaft associated with the back running gear wheels to allow the bagging machine to move, and where compression/decompression of a spring sensitively assembled on the chassis in reply to pulling variations during the bagging machine operation causes such spring to trigger a bolt that activates a cam that triggers a third inverted operation hydraulic pump for reception/release of braking fluid from/to the secondary braking mechanism circuit for braking force compensation.

Preferably, the spring is mounted between an upper plate and a lower plate that pivot independently from each other as a result of the push received by the bagging machine as it moves forward.

In addition, in order to make it easier to attach the silo bag to the grain bagging machine, the upper part of the tunnel or semitunnel is mobile, which allows it to move from an upper working position to a lower loading position of the silo bag, substantially close to ground level, so that it remains at a very short distance from the ground and parallel to it, while the sides of the bagging tunnel remain folded, blocking the hopper outlet.

Preferably, the semitunnel is mounted on the end of two articulated arms operated by means of a winch.

Attaching the silo bag to the discharge end of the bagging machine may be easily done by a single worker: the abovementioned folded bag forms a ring that rests on the edge of said semitunnel mouth which is in a horizontal position close to ground level; using the appropriate mechanic tools, such as a manual winch, it is gradually raised to a vertical working position with the bag mounted on it.

As the semitunnel rises, the bag adopts a vertical position and may be manually arranged to its working position around the tunnel mouth.

Another object of the present invention is a dual compensated braking device to be applied to a self-propelled grain bagging machine, comprising:

a primary braking mechanism made up of a primary circuit with braking fluid for transmitting working pressure on a primary caliper, such pressure being generated by means of a first hydraulic pump; and a secondary braking mechanism made up of a secondary circuit with braking fluid for transmitting working pressure on a secondary caliper, such pressure being generated by means of a second hydraulic pump;

where both the primary and secondary calipers act on opposite sides of a disk brake attached to an effector shaft that comprises a first sprocket connected by means of a drive chain to a second sprocket mounted on the shaft associated with the back running gear wheels to allow the bagging machine to move, and where compression/decompression of a spring sensitively assembled on the chassis in reply to pulling variations during the bagging machine operation causes such spring to trigger a bolt that activates a cam that triggers a third inverted operation hydraulic pump for reception/release of braking fluid from/to the secondary braking mechanism circuit for braking compensation.

In order to clarify and better understand the advantages briefly commented so far, there follows a non-restrictive description of a preferred example of embodiment, schematically graphed in the attached figures, without following any particular scale.

DETAILED DESCRIPTION OF THE INVENTION

The following is a detailed description and explanation of the preferred embodiments of the invention and best modes for practicing the invention.

With the purpose of clarifying the invention description, the terms "around", "approximately" or any other similar word used throughout this patent description and claims shall mean that the numerical values referred to are close to the limit values specifically mentioned and within a tolerance range of plus/minus 20%, preferably plus/minus 10%, and even more preferably, plus/minus 5%. Such ranges are determined by the measuring method used and the reliability limits set forth on determining the respective values.

For the purpose of this description, the term "substantially" shall mean that the manner, circumstance, size, measure or any other feature described but syntactically associated with it are similar, to the extent it is desired, to such manner, circumstance, size, measure or any other feature as it is definitely and unmistakably known. More precisely, such term is intended to mean that what is described is equivalent to the effects of the invention or is similar to the concrete reference used to embody the description in question, without necessarily being identical.

Figure 1:
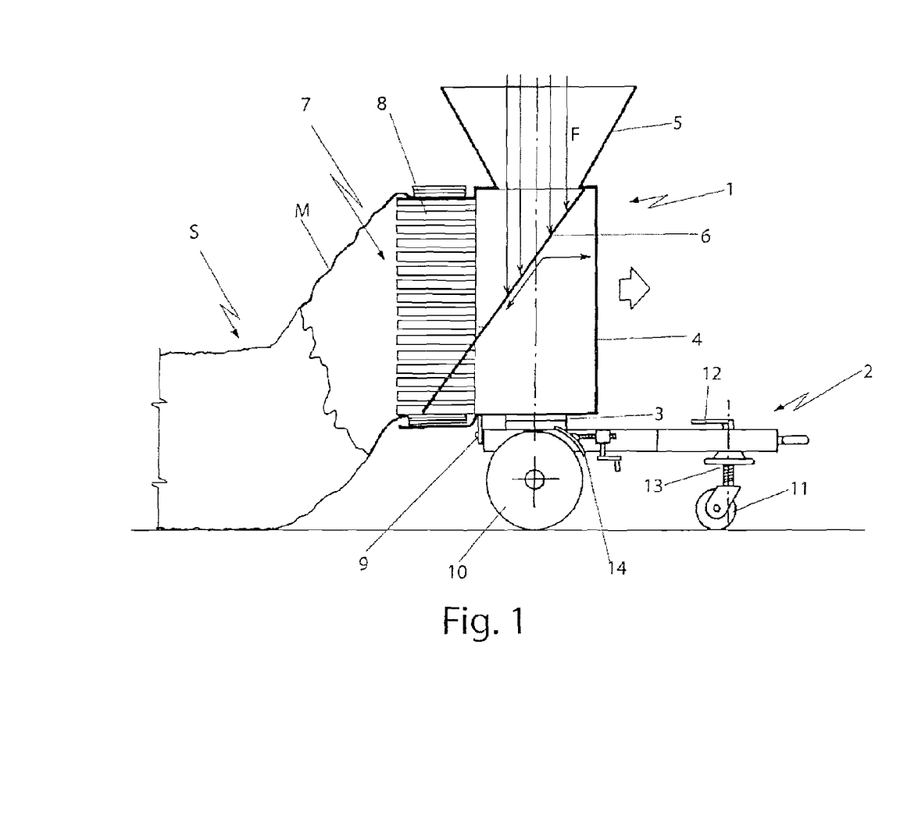
FIG. 1 is a vertical longitudinal cut of a self-propelled bagging machine for storing grain in a sleeve according to the Prior Art, shown during the process of feeding grain into the silo bag.
Figure 2:
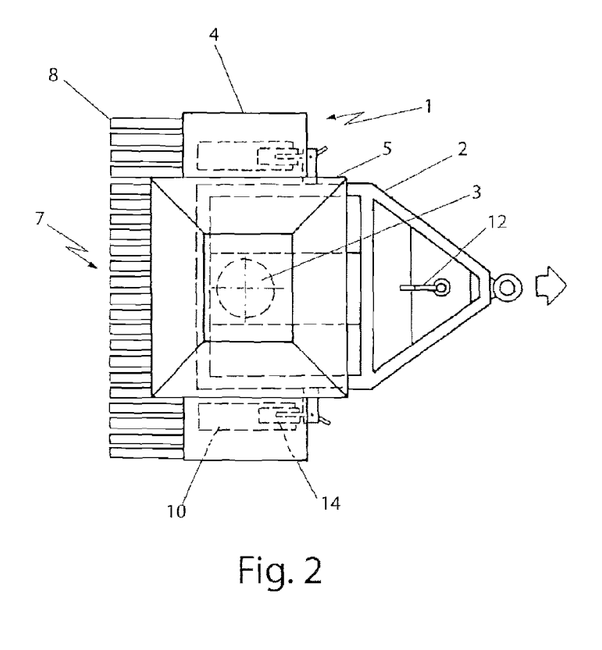
FIG. 2 is a top side view of a self-propelled bagging machine for storing grain in a sleeve according to the Prior Art of FIG. 1, ready to be moved.

FIGS. 1 and 2 show a self-propelled grain bagging machine according to the Prior Art, as described in patent AR 010974 B1. The movement of such bagging machine when at work must be adjusted by means of independent brakes assembled onto each of the wheels to ensure an effective feeding of grain into the silo bag, the balance between both brakes being difficult to attain, on the one hand, as a straight-line forward movement of the machine is involved, while on the other hand, the brakes, once calibrated, do not allow automatic adaptation to the ground surface unevenness. Furthermore, attaching the silo bag to the bagging tunnel mouth of the machine is a task that demands more than one worker due to its size and weight.

Figure 3:
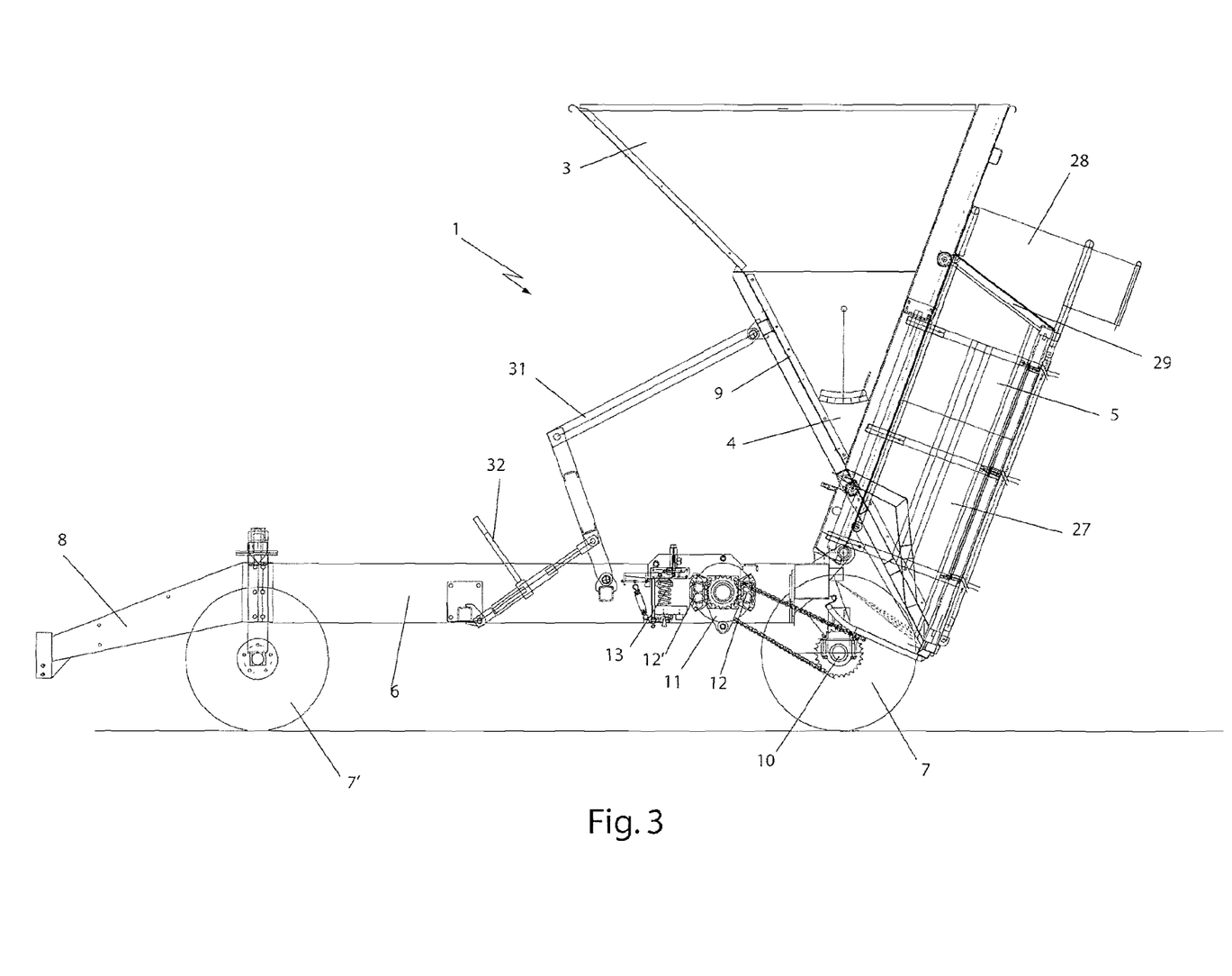
FIG. 3 is a cross-cut side view of a preferred embodiment of a self-propelled bagging machine for storing grain in a sleeve according to the present invention, in working position, showing the location of the unified braking system.
Figure 4:
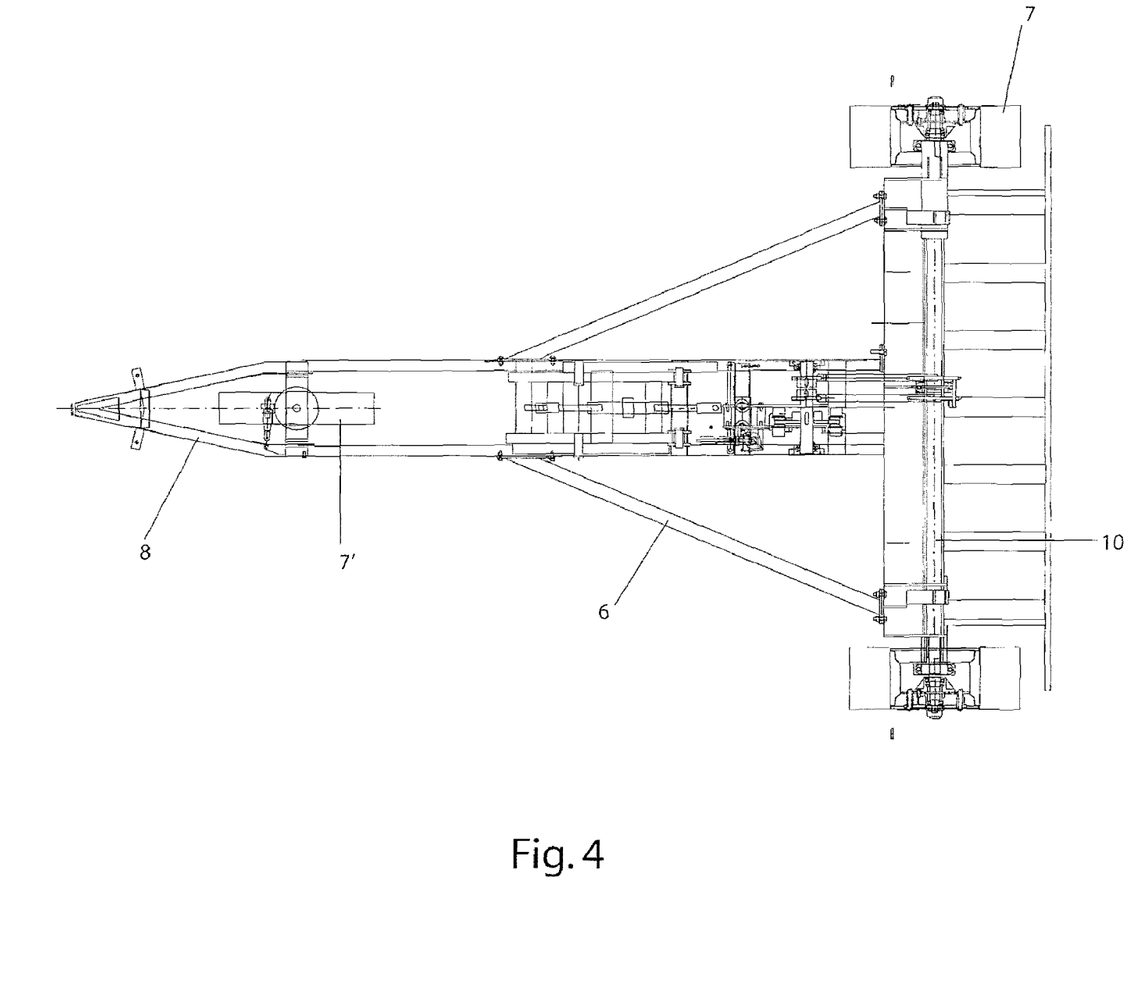
FIG. 4 is a cross-cut plan view at the level of the chassis supporting the self-propelled bagging machine for storing grain in a sleeve shown in FIG. 3, showing the central location of the braking system.
Figure 5:
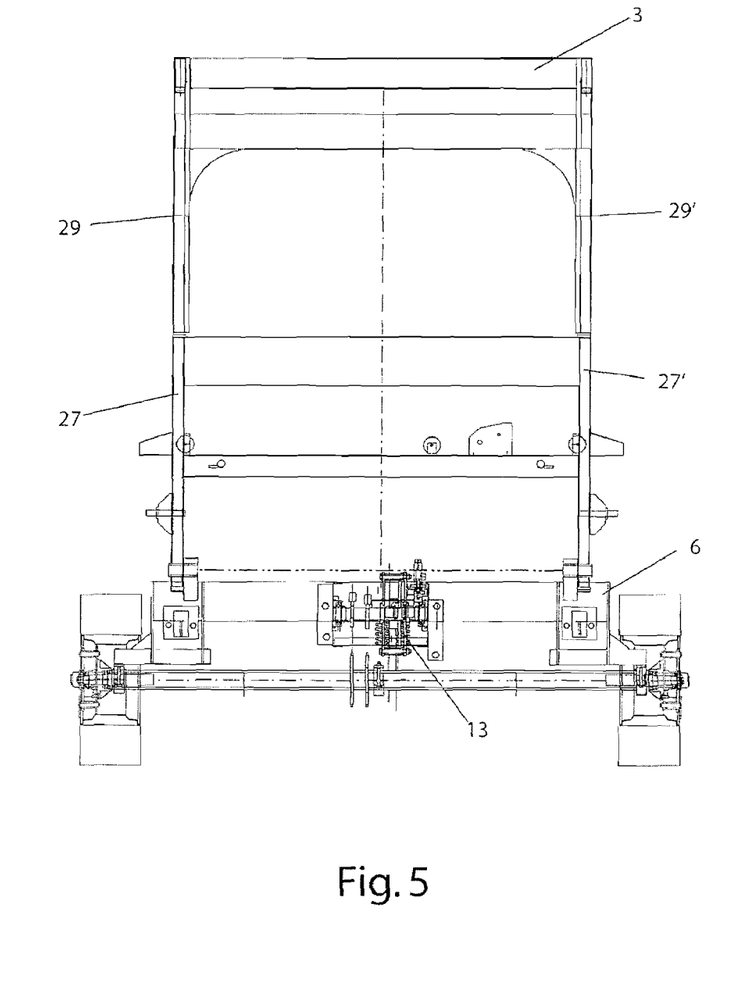
FIG. 5 is a cross-cut rear view at the level of the thrust line of the self-propelled bagging machine for storing grain in a sleeve shown in FIG. 3, showing the central location of the braking system.

In order to correct these inconveniences derived from the state of the art, the object of the present invention is proposed, consisting in a self-propelled bagging machine (1) for storing grain in a sleeve (2), or foldable plastic pipe or silo bag, comprising a receiving hopper (3) arranged on the top, which outlet (4) leads to a grain discharge tunnel (5) over which said folded bag (2) fits, all of this mounted on a chassis (6) fitted with running gear (7 and 7') and dragging pole (8), where said outlet (4) of the hopper (3) comprises a partition wall (9) transversally connected with the hopper (3) according to a downward slant plane leading to the discharge tunnel (5) arranged under the vertical projection of the mouth of said hopper (3) and where said running gear (7 and 7') comprises a single-shaft (10) back running gear (7) and a smaller front steering running gear (7'); said grain bagging machine (1) also includes a dual compensated braking device (11) made up of an adjustable primary hydraulic braking mechanism (12) and an adjustable secondary hydraulic braking mechanism (12') acting simultaneously on the back shaft (10) of the bagging machine (1), and where a mechanic articulation (13) mounted on the chassis (6) sensitive to pulling variations during the machine (1) operation triggers an inverted operation hydraulic pump (14) for reception/release of braking fluid from/to the secondary braking mechanism (12') circuit (18') for braking compensation.

Preferably, the primary (12) and secondary (12') braking mechanisms are manually adjusted.

The folded sleeve placed outside the discharge tunnel has a closed end at the discharge tunnel mouth, and during the filling process, a silo bag is formed as the machine is pushed forward by the incoming grain.

Figure 6:
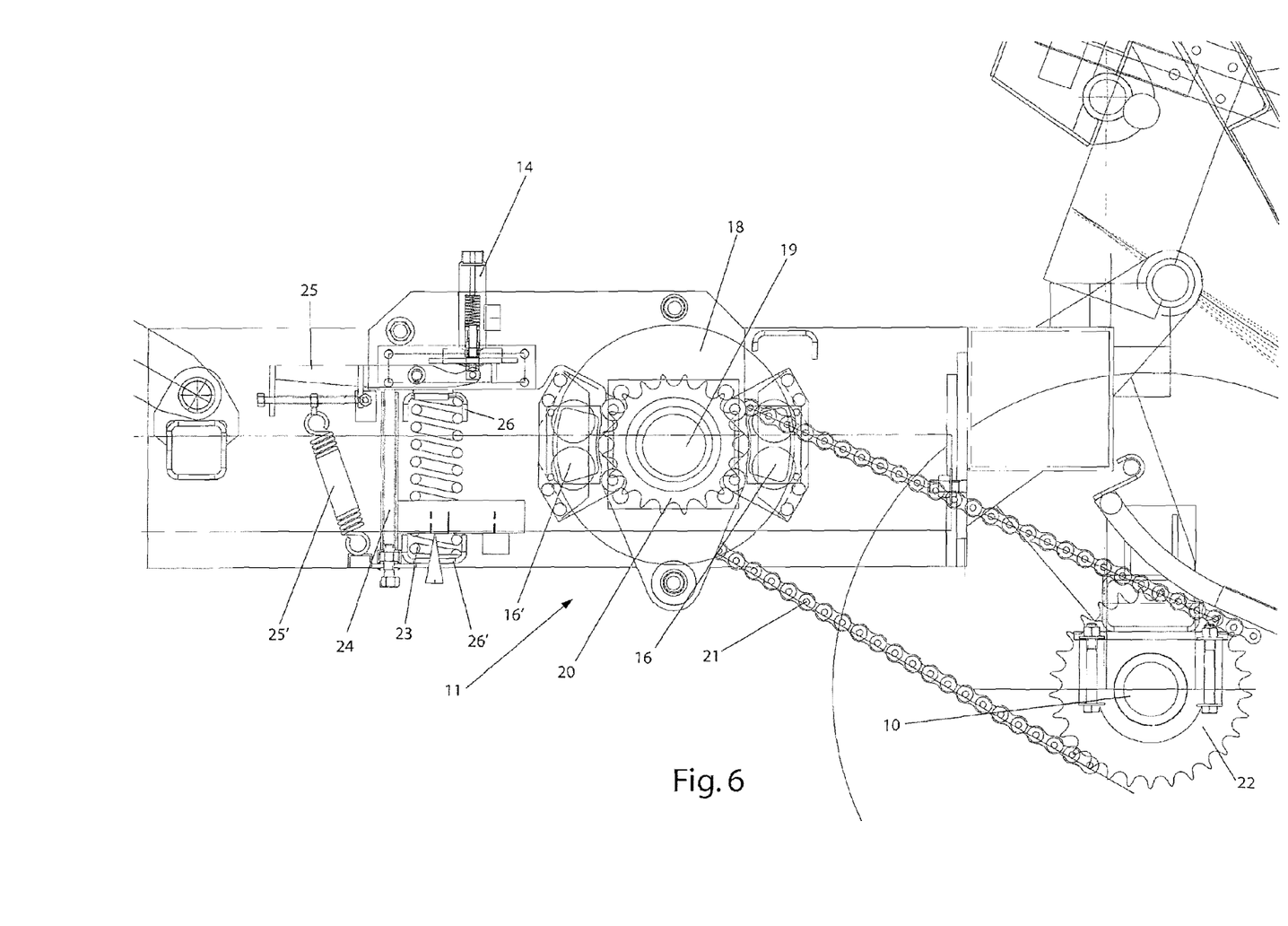
FIG. 6 is a cross-cut side view of the braking system of the self-propelled bagging machine for storing grain in a sleeve shown in FIG. 3, showing its constituent elements and their connection.
Figure 7:
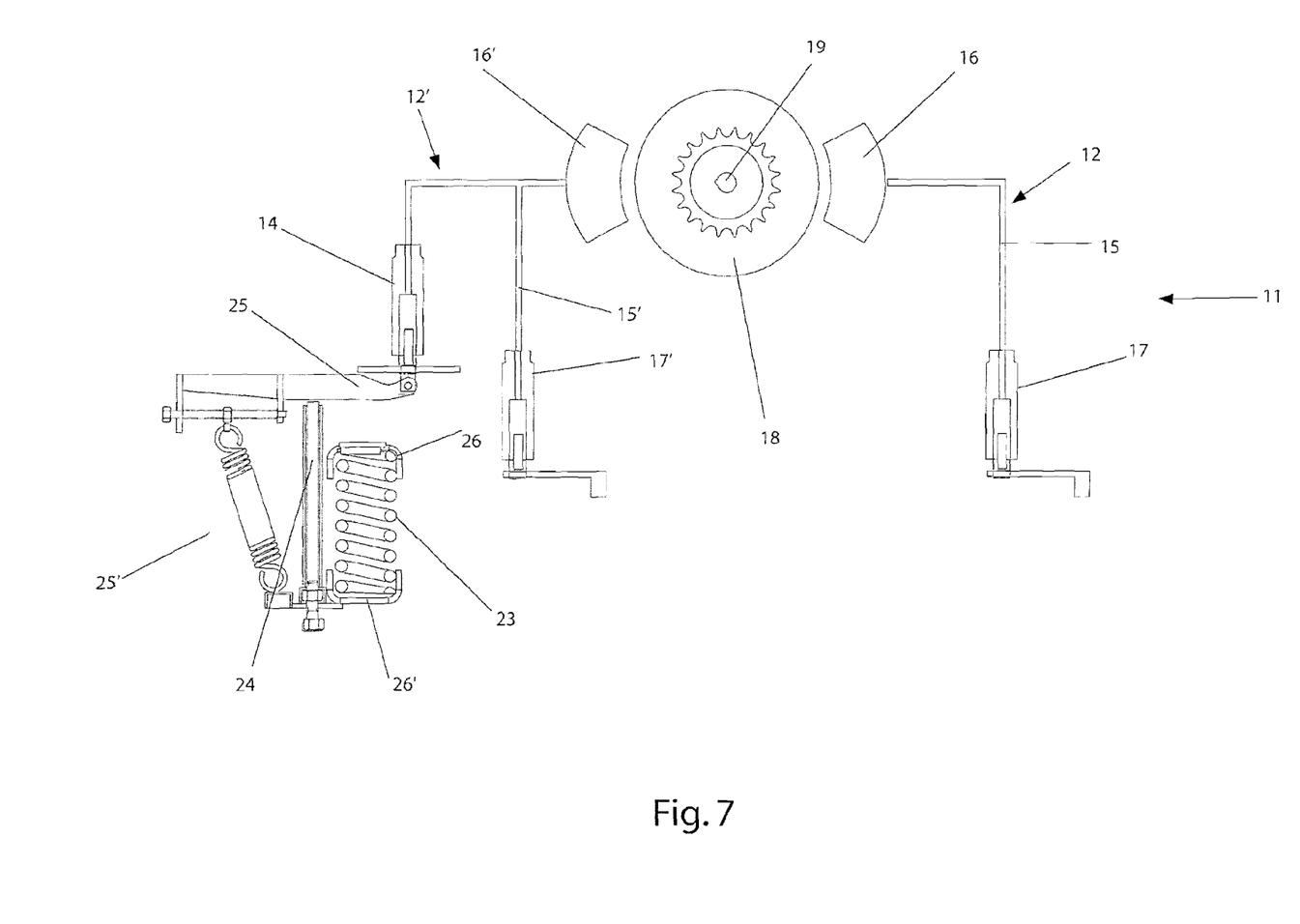
FIG. 7 is a schematic view of the braking system of the self-propelled bagging machine for storing grain in a sleeve shown in FIG. 6, showing its constituent elements and their connection.
Figure 8A:
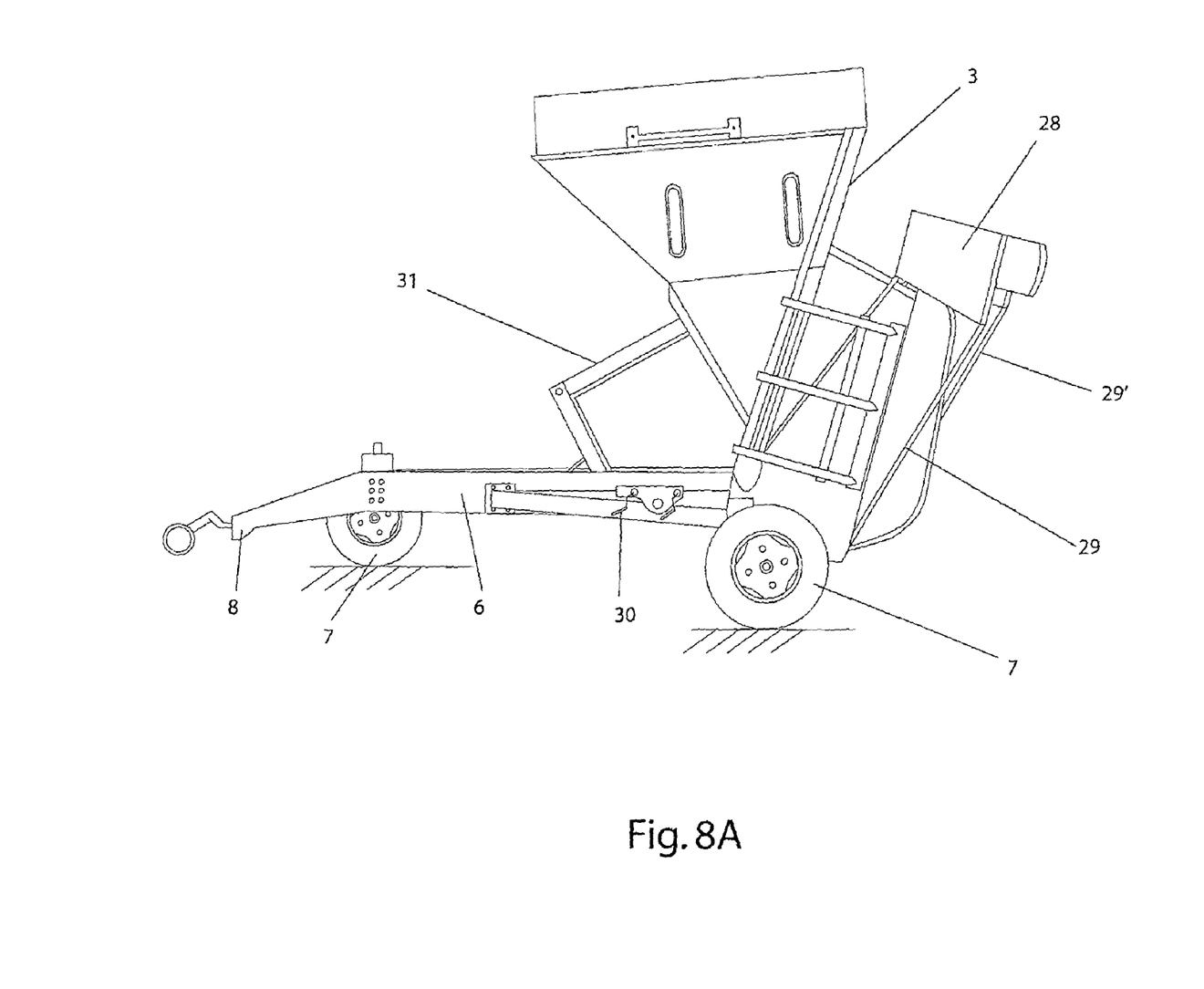
FIGS. 8A, 8B, 8C, 8D, 8E, 8F and 8G show the sequence of unfolding the semitunnel from an upper working position to a lower loading position of the silo bag, followed by the raising of the bag resting on the semitunnel from the lower loading position to the upper working position.
Figure 8B:
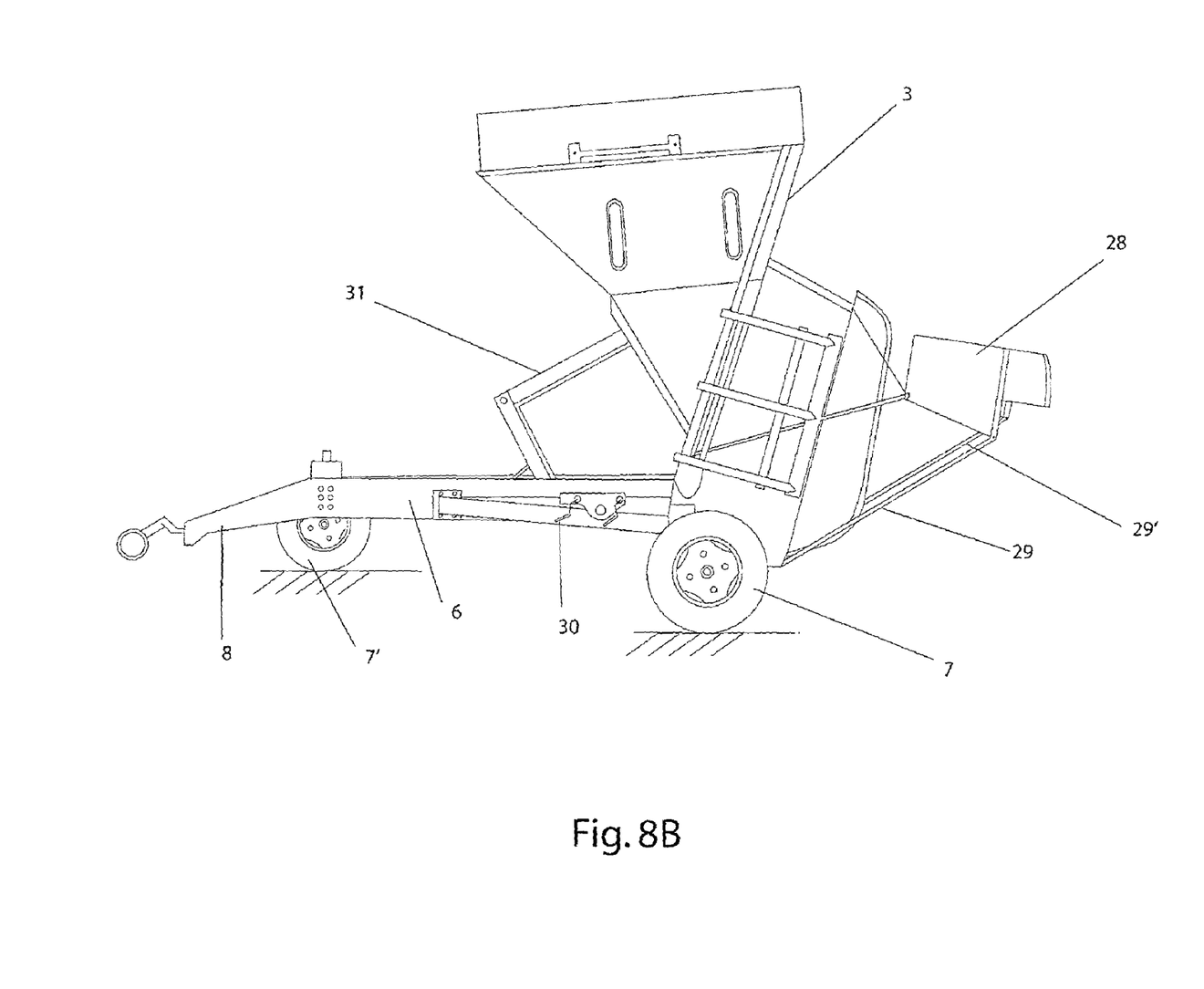
Figure 8C:
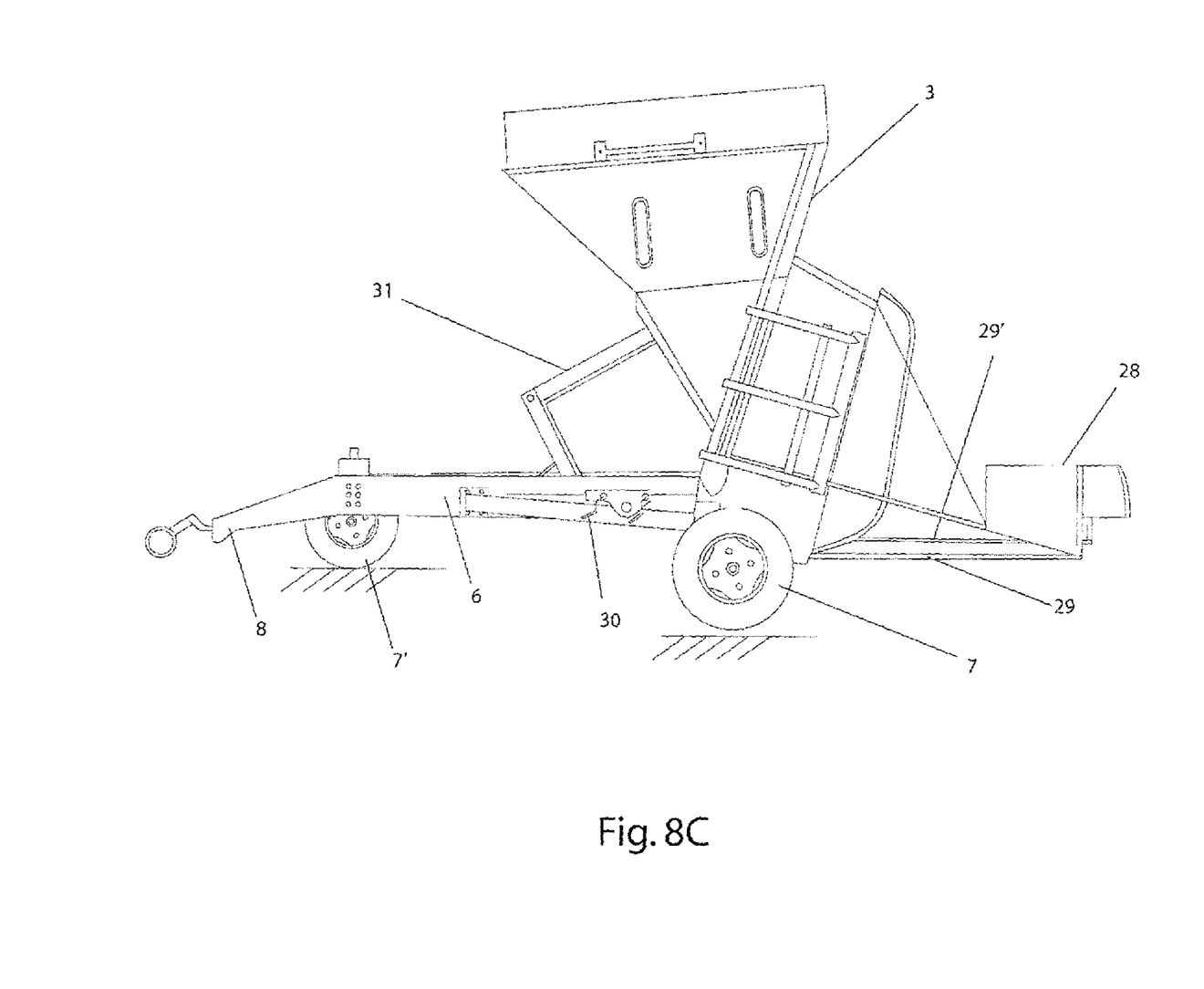
Figure 8D:
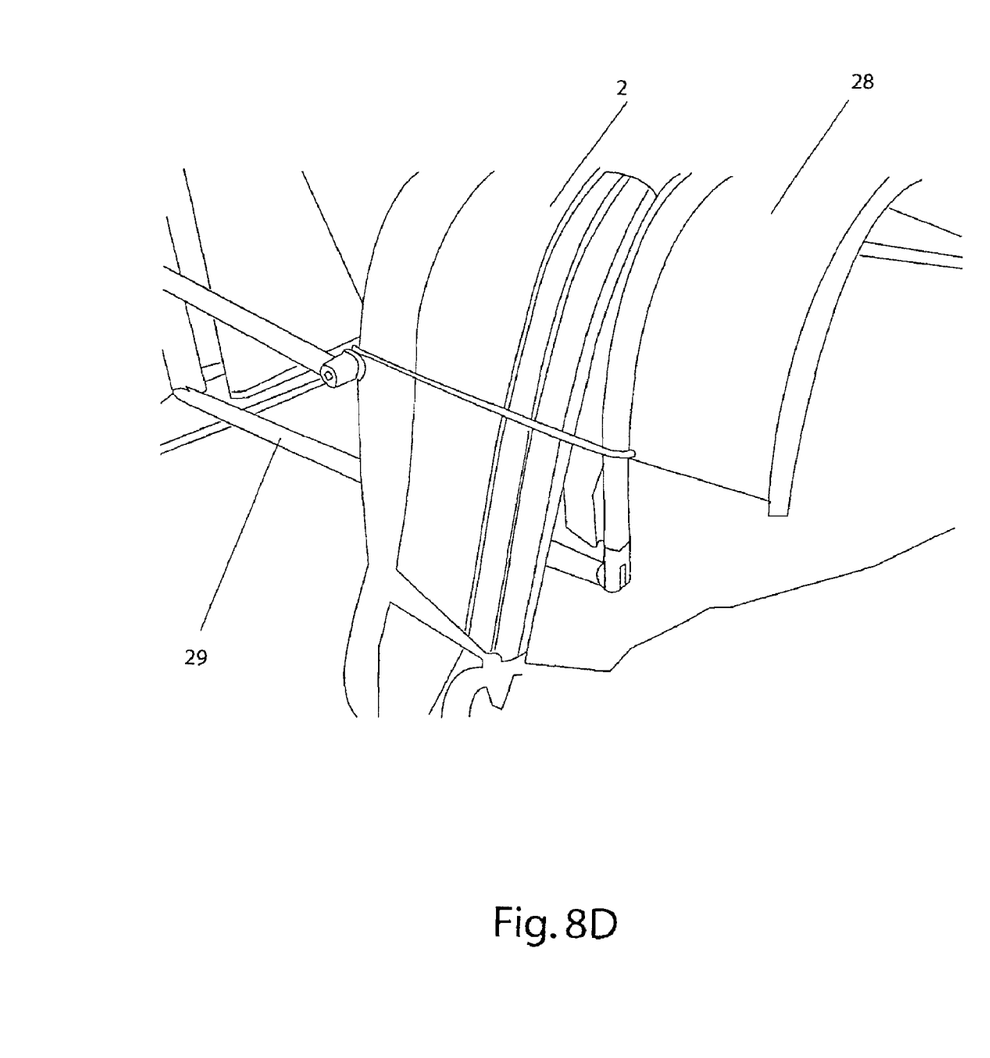
Figure 8E:
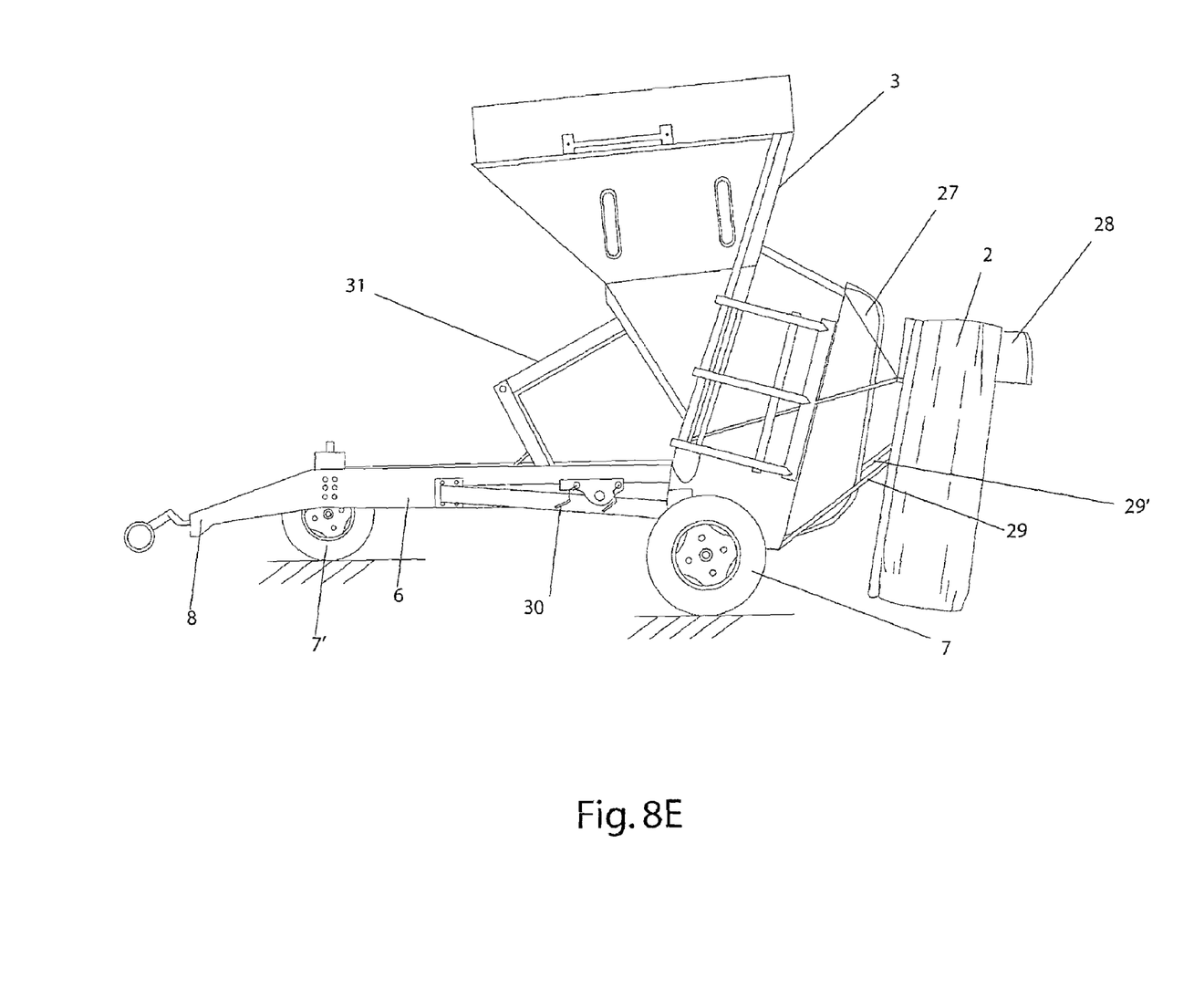
Figure 8F:
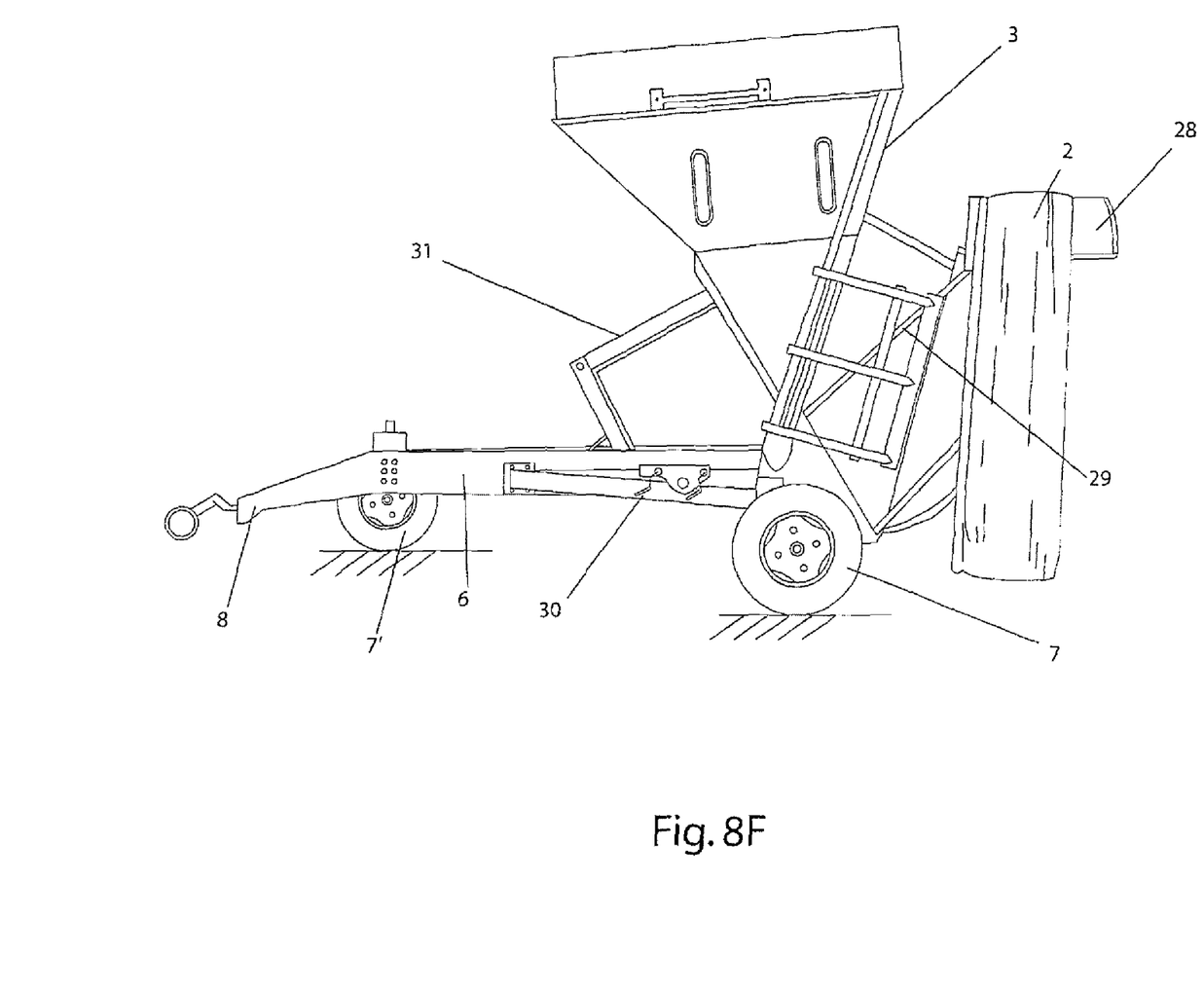
Figure 8G:
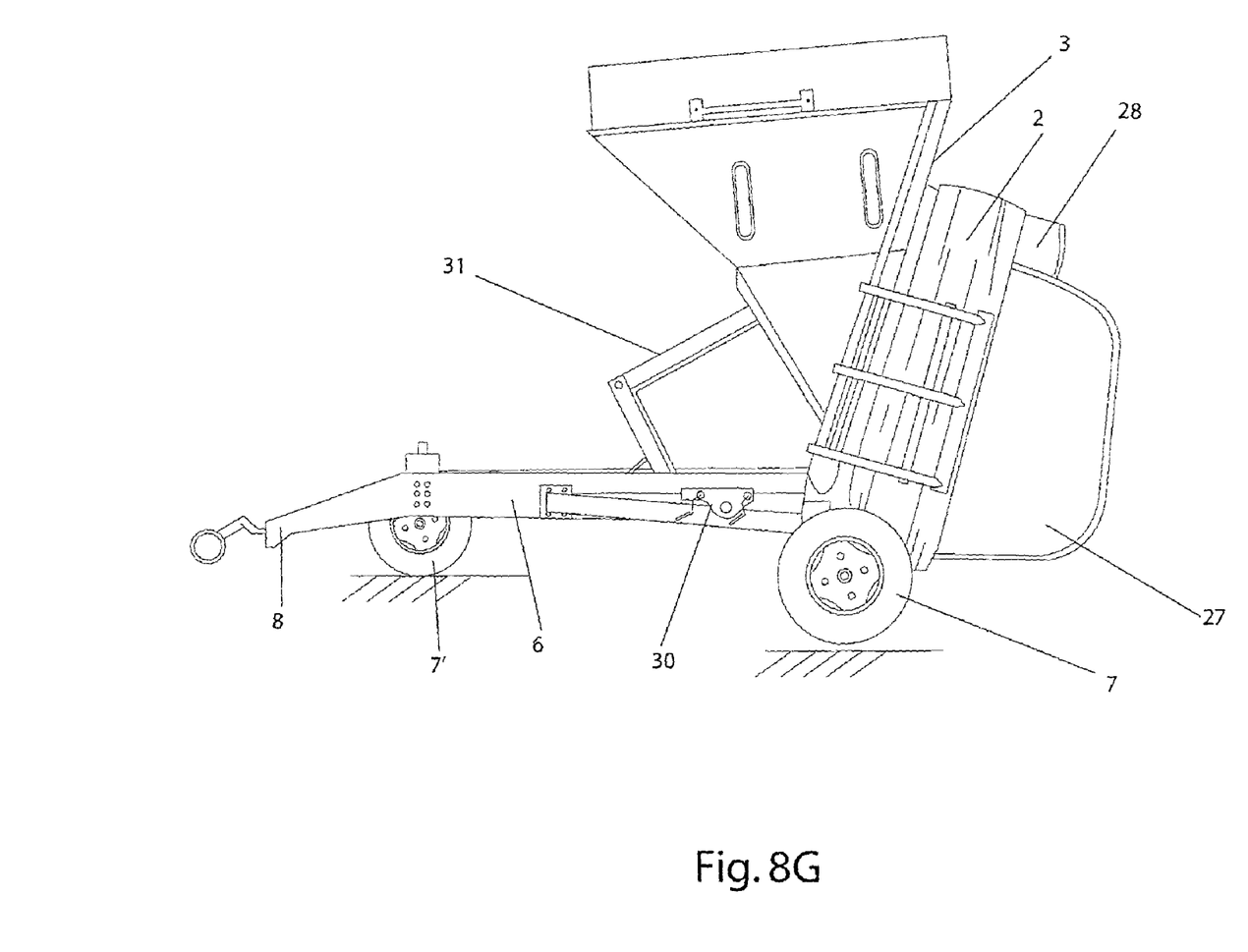

Preferably, the dual compensated braking device (11) of the self-propelled grain bagging machine (1) has:

a primary braking mechanism (12) comprising a primary circuit (15) with braking fluid for transmitting a working pressure on a primary caliper (16), such pressure being generated by a first hydraulic pump (17); and a secondary braking mechanism (12') comprising a secondary circuit (15') with braking fluid for transmitting a working pressure on a secondary caliper (16'), such pressure being generated by a second hydraulic pump (17');

where both the primary (16) and secondary (16') calipers act on opposite sides of a disk brake (18) attached to an effector shaft (19) comprising a first sprocket (20) connected by means of a drive chain (21) to a second sprocket (22) mounted on the shaft (10) of the back running gear wheels to allow the bagging machine (1) to move, and where compression/decompression of a spring (23) sensitively mounted on the chassis (6) in reply to pulling variations during the bagging machine (1) operation causes such spring (23) to trigger a bolt (24) that activates a cam (25) that triggers a third inverted operation hydraulic pump (14) for reception/release of braking fluid from/to the secondary circuit (15') for braking force compensation. A second spring (25') associated to the above-mentioned cam (25) keeps it in its right position.

Preferably, the spring (23) is mounted between an upper plate (26) and a lower plate (26') that pivot independently from each other as a result of the push received by the bagging machine (1) as it moves forward.

The primary circuit (15) working pressure is adjusted to range between 50 kg/cm$^2$ and 150 kg/cm$^2$ approximately depending on the push force per specific gravity and sliding angle of the material to be stored in the silo. When selecting the primary circuit working pressure, such circuit works at a working pressure equivalent to about 70% of the dual compensated braking device (11) total braking capacity.

The secondary circuit (15') working pressure is adjusted to range between 15 kg/cm$^2$ and 45 kg/cm$^2$ approximately, such working pressure being equal to about 30% of the dual compensated braking device (11) total braking capacity.

Preferably, the discharge tunnel (5) of the self-propelled grain bagging machine (1) of the present invention may comprise two sides (27 and 27') and an upper part of the tunnel or semitunnel (28), wherein such sides (27 and 27') may change from an unfolded position to a folded one at the outlet the grain goes through while the sleeve is being filled (2), while the semitunnel (28) is mounted on the end of two articulated arms (29 and 29') arranged at each side of the machine (1), which allow such semitunnel (28) to adopt any desired position, from an upper working position to an unfolded one close to ground level.

This detachable embodiment of the discharge tunnel (5) is aimed at making it possible for a single person to attach the sleeve (2) or silo bag onto the grain bagging machine (1).

Therefore, the mobile semitunnel (28) is mounted in such a way that it can be moved from an upper working position to a lower loading position for the sleeve (2) or bag folded substantially close to ground level, i.e. at a very short distance from the ground and parallel to it, while the sides of the bagging tunnel (5) are folded at the outlet (4) of the hopper (3).

Preferably, the semitunnel (28) is mounted on the end of the two articulated arms (29 and 29'), which are manually operated by means of a winch (30).

Thus, as we can see in the sequence of FIGS. 7 A, 7 B, 7 C, 7 D, 7 E, 7 F and 7 G, the sleeve (2) or silo bag, which weight ranges from about 110 to 130 kg, is simply arranged outside the discharge tunnel (5) of the bagging machine (1) by a single operator: the above-mentioned folded sleeve (2) forms a ring that rests outside the semitunnel (28) lying in a horizontal position close to ground level, and such semitunnel is gradually lifted by using appropriate mechanical means such as a manual winch, until it adopts an upper working position with the sleeve (2) mounted on it.

As the semitunnel (28) is lifted, the sleeve (2) adopts a vertical position and can be manually arranged into its working position around the discharge tunnel (5).

The grain discharge hopper (3) is collapsible, which allows safe transportation of the bagging machine (1) from one workplace to another. The hopper is folded and unfolded by means of an articulated arm (31) operated by appropriate mechanic means (32), preferably a winch or hydraulic cylinder.

Use of the Self-Propelled Grain Bagging Machine

Preferably and by way of unrestrictive example, in order to place the bagging machine in its working position, one must first unhook the chassis from the vehicle used to move the bagging machine by engaging a prop jack onto the dragging pole and fixing it to the right position, for example, by means of a safety bolt.

The machine must then be pulled to a stop in order to set it to its working mode.

First, the wheels must be attached to the bagging machine shaft so that the braking system may act on them. Preferably, this should be done by applying a mechanic lock to each wheel, fixing them to the shaft. Preferably, such lock is a suitably assembled piece that is threaded into a hole on the tire and another hole on the tongue fixed to the machine shaft, thus permanently connecting each tire with the shaft and allowing the braking mechanism to operate effectively.

Then, braking may be preferably achieved by applying braking pressure by means of a primary circuit manual brake hydraulic pump—for example—to a required value ranging from about 50 kg/cm$^2$ to about 150 kg/cm$^2$ for safe handling while the plastic sleeve is being attached.

Next, in order to attach the sleeve to be filled with grain and form a silo bag, the sides of the discharge tunnel must be closed at the grain outlet, and the upper part of the bagging tunnel or semitunnel must then be lowered to a position close to ground level by using an appropriate mechanic means, such as a manual winch or other suitable mechanism.

To that effect, side bindings are released from the upper part of the mouth of the bagging tunnel or semitunnel to allow it to come down, and the sides of the grain discharge tunnel are folded at the outlet of the discharge tunnel. The semitunnel is lowered from its upper position by using a winch, for example, until a comfortable position is achieved close to ground level to place the sleeve outside the tunnel on a surface provided to that effect.

Fold fastening rollers arranged sideways are opened by pulling the respective levers to allow the passage of the sleeve.

The sleeve is placed on the outside surface of the semitunnel prepared as a sleeve holder, in such a way that the sleeve folds remain on the outside, and the sleeve is attached with straps to prevent it from moving when the semitunnel and folded sleeve assembly is lifted.

Next, the semitunnel is raised with the sleeve placed on the above-mentioned sleeve holder, fixing it again with its bindings by using purpose-made fasteners.

The sleeve is then fitted over the mouth of the discharge tunnel, with its folds perfectly arranged.

The sides of the tunnel are unfolded again by releasing the bindings and fastening them to their working position by using their binding elements, connecting the sides and semitunnel assembly to form the discharge tunnel.

The end of the sleeve is released by spreading its folds, and once the starting end of the sleeve is closed, the fold fastening rollers acting on the outside surface of the discharge tunnel are locked at the site where the sides of the tunnel are folded, leaving the sleeve tightened by the rollers fastening the sleeve folds with enough pressure to gradually allow its free passage as it is filled with grain during the bagging operation.

The running gear braking device must be adjusted to an appropriate initial value to compensate for the push received by the bagging machine during the grain feeding process, thus achieving a speed compatible with the grain income flow and the desired grain compacting.

The bag starts to be filled, and once the first part is formed, the grain will have reached the upper part of the tunnel, which is equal to about 10 to 15 tons; at that time, the first brake pressure is gradually increased, forming an upward grain slope of about 45°.

It should be checked that the plastic bag does not stretch beyond the limits indicated by the manufacturer or supplier. Preferably, a 1 cm tolerance is considered, as the bag, once filled, usually keeps stretching.

Next, the secondary circuit brake is adjusted with its respective hydraulic pump to a value lower than that of the primary circuit by applying an additional pressure, so that responsibility for 30% of the force exerted by the braking device lies with this secondary circuit, leaving 70% of the total braking force for the primary circuit.

This calibration is much faster and effective than what is known in the art and allows a prompt alternate readjustment if necessary, always keeping a higher pressure for the primary circuit rather than the secondary one.

Once these stretching values for the sleeve have been achieved by the first brake of the grain bagging machine, such values are left until the sleeve is full to the top.

Once the bag has been attached, the bagging machine is ready to start feeding grain into the sleeve to form a silo bag.

While in bagging position, the machine moves along with a back running gear and a smaller front steering running gear, which preferably has a steering lever and a height adjuster operated by means of a vertical threaded bar.

The drop in the grain flow entering through the hopper has a direct effect on the slant wall, creating a component capable of affecting the silo compacting, and another component capable of pushing the bagging machine forward, which resistance is graduated by the braking device described above, thus achieving a pace according to the load speed and the compacting degree required in a certain direction.

The silo bag filling mouth is wide enough to cause large volumes to be stored in very short lengths.

The bagging capacity of the bagging machine is indefinite and depends only on the amount of material to be stored that may be managed, as work is done on demand.

When about five folds are left in the tunnel, the machine hopper should stop receiving grain.

As soon as a silo bag is full with grain, the primary and secondary braking mechanisms must be loosened, the wheels of the machine shaft must be released to run freely, and the bagging machine must be hooked to a traction vehicle, changing from the full bag mode to the new bag filling mode.

Once the machine is back in the new bag filling mode, the process described above starts all over again.

The grain bagging machine may be stopped at any time, even if the bag is not full, by placing the primary braking device at top pressure to prevent the machine from moving. In order to proceed with the bagging operation, pressure is applied on the primary and secondary brakes again to the preset value, following the procedure described above.

To disassemble the bagging machine for transportation to another facility or field, the fasteners of the tunnel sides are removed, folding the sides and holding them together by using their respective safety locks.

The receiving hopper and discharge tunnel assembly is lowered frontwards by causing it to rest on the chassis by means of an articulated arm operated by an appropriate mechanism such as a manual winch or hydraulic device, and the assembly is kept together by using its respective locks.

Thus, it will be attached to the tractor vehicle, which height will keep the front stabilizing running gear raised from the ground, and the bagging machine will run along on a single back running gear.

However, in case towing is performed by using a shorter vehicle, such front running gear may be lifted by means of an adjustment mechanism, which constitutes a considerable advantage, since the machine may be transported by using any smaller vehicle when a tractor is not necessary for grain bagging operation.

INDUSTRIAL APPLICATION OF THE INVENTION

The present invention applies to the industry associated with the manufacture of agricultural tools and appliances, mainly the industry engaged with the manufacture of agricultural machinery and parts as well as related industries, which will be highly benefitted from having a self-propelled bagging machine for storing grain in a sleeve, and a dual compensated braking device to be applied thereto as described before, which provide a major comparative advantage with respect to what is known in the art.

Final Considerations

Any changes to and variations of the self-propelled bagging machine for storing grain in a sleeve and dual compensated braking device applied thereto as described in the present invention will be evident to expert technicians, without this implying a deviation from the scope and spirit of the invention. Although the invention has been described in connection with preferred embodiments, it should be understood that the invention, as it has been claimed, should not be unduly limited to such specific embodiments. In fact, all changes to the manner described above to implement the invention which are evident to the experts in the respective field of art or related fields are intended to be included within the scope of the following claims.

Claims are part of the description of the invention subject matter of this patent application.

The self-propelled bagging machine for storing grain in a sleeve and dual compensated braking device applicable thereto as per the above descriptions and illustrations fall within the scope of protection of this Patent of Invention, which is basically determined by the terms of the following claims.

The invention claimed is:

1. A self-propelled bagging machine for storing grain in a sleeve made up of an upper receiving hopper which outlet leads to a grain discharge tunnel over which such folded sleeve fits, said hopper, tunnel and sleeve being mounted on a chassis equipped with running gear and dragging pole, where such hopper outlet comprises a partition wall that is transversally connected to the hopper according to a downward slant plane leading to the discharge tunnel arranged under the vertical projection of the mouth of said hopper, and where such running gear comprises a back single-shaft running gear permanently connected with the wheels, and a smaller front steering running gear; such grain bagging machine being further CHARACTERIZED in that it includes a dual compensated braking device comprising: an adjustable primary hydraulic braking mechanism and an adjustable secondary hydraulic braking mechanism which act simultaneously on the back shaft of the bagging machine, and where a mechanic articulation mounted on the chassis sensitive to pulling variations during the machine operation acts on an inverted operation hydraulic pump for reception and release of braking fluid from and to the secondary braking mechanism circuit for braking compensation.

2. The self-propelled grain bagging machine as in claim 1, CHARACTERIZED in that the dual compensated braking device comprises:
   a primary braking mechanism including: a primary circuit with braking fluid for transmitting working pressure on a primary caliper, such pressure being generated by means of a first hydraulic pump; and
   a secondary braking mechanism made up of: a secondary circuit with braking fluid for transmitting working pressure on a primary caliper, such pressure being generated by means of a second hydraulic pump;
   where both primary and secondary calipers act on opposite sides of a disk brake attached to an effector shaft that comprises a first sprocket connected by means of a drive chain to a second sprocket mounted on the shaft of the back running gear for the bagging machine transportation, and where compression and decompression of a spring sensitively assembled on the chassis in reply to pulling variations during the bagging machine operation causes such spring to trigger a bolt that activates a cam that triggers a third inverted operation hydraulic pump for reception and release of braking fluid from and to the secondary braking mechanism circuit for braking force compensation.

3. The self-propelled grain bagging machine as in claim 2, further CHARACTERIZED in that the spring is mounted between an upper plate and a lower plate that pivot independently from each other as a result of the push received by the bagging machine as it moves forward.

4. The self-propelled grain bagging machine as in claim 1, CHARACTERIZED in that the working pressure is adjusted to range between 50 kg/cm$^2$ and 150 kg/cm$^2$ approximately.

5. The self-propelled grain bagging machine as in claim 4, CHARACTERIZED in that such working pressure of the primary circuit is equal to about 70% of the dual compensated braking device total braking capacity.

6. The self-propelled grain bagging machine as in claim 1, CHARACTERIZED in that the secondary circuit working pressure is adjusted to range between 15 kg/cm$^2$ and 45 kg/cm$^2$ approximately.

7. The self-propelled grain bagging machine as in claim 6, CHARACTERIZED in that such working pressure of the secondary circuit is equal to about 30% of the dual compensated braking device total braking capacity.

8. The self-propelled grain bagging machine as in claim 1, further CHARACTERIZED in that the discharge tunnel comprises two sides and an upper part or semitunnel, where such sides may change from an unfolded position to a folded position on the outlet of the discharge tunnel, and the semitunnel is mounted on the end of two articulated arms arranged on each side of the machine, allowing such semitunnel to adopt different positions from an upper working position to an unfolded one close to ground level.

9. The self-propelled grain bagging machine as in claim 8, CHARACTERIZED in that an extreme position adopted by the semitunnel is an upper working position next to the machine hopper.

10. The self-propelled grain bagging machine as in claim 8, CHARACTERIZED in that an extreme position adopted by the semitunnel is an unfolded position close to ground level and separate from the machine hopper.

11. The self-propelled grain bagging machine as in claim 1, CHARACTERIZED in that the grain receiving hopper is collapsible thanks to an articulated mechanical arm, which ensures safe transportation of the bagging machine from one workplace to another.

12. The self-propelled grain bagging machine as in claim 11, CHARACTERIZED in that the articulated arm is operated by means of a winch or hydraulic mechanism.

* * * * *